United States Patent
Mangal

(10) Patent No.: US 7,174,156 B1
(45) Date of Patent: Feb. 6, 2007

(54) METHOD AND SYSTEM FOR TRACKING AND BILLING VOCODER BYPASS CALLS IN A WIRELESS WIDE AREA NETWORK

(75) Inventor: Manish Mangal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 480 days.

(21) Appl. No.: 10/842,876

(22) Filed: May 10, 2004

(51) Int. Cl.
*H04M 11/00* (2006.01)
(52) U.S. Cl. .................................... 455/406; 379/126
(58) Field of Classification Search ............... 455/417, 455/414.1, 422.1, 406, 408, 428; 379/114.01, 379/114.03, 114.05, 114.06, 114.07, 114.08, 379/114.1, 114.11, 114.12, 121.04, 121.05
See application file for complete search history.

(56) References Cited

U.S. PATENT DOCUMENTS

| | | | |
|---|---|---|---|
| 5,793,810 A | * | 8/1998 | Han et al. ............... 375/242 |
| 5,956,673 A | * | 9/1999 | Weaver et al. ............... 704/221 |
| 6,091,969 A | * | 7/2000 | Brophy et al. ............... 455/560 |
| 6,574,465 B2 | * | 6/2003 | Marsh et al. ............... 455/406 |
| 6,574,469 B1 | * | 6/2003 | Xiang et al. ............... 455/416 |
| 6,704,402 B1 | * | 3/2004 | Pacifico et al. ........ 379/114.02 |
| 2003/0161294 A1 | * | 8/2003 | Yepez et al. ............... 370/352 |

* cited by examiner

*Primary Examiner*—George Eng
*Assistant Examiner*—Julie E Stein

(57) ABSTRACT

For calls involving a wireless device on a wireless wide area network, a network entity may create an electronic record for the call that includes an indication of whether the call was established with vocoder bypass. A service provider of the wireless wide area network may then use the indications in the electronic records, at least in part, as a basis for billing a user of the wireless device. The service provider may additionally use the electronic records to generate statistics about the usage of the wireless wide area network.

8 Claims, 3 Drawing Sheets

METHOD AND SYSTEM FOR TRACKING AND BILLING VOCODER BYPASS CALLS IN A WIRELESS WIDE AREA NETWORK

FIELD OF THE INVENTION

The present invention relates to wireless wide area networks. More specifically, it relates to enhanced billing of vocoder bypass calls in wireless wide area networks.

BACKGROUND OF THE INVENTION

Service providers of wireless wide area networks, such as wireless telecommunication networks, commonly offer subscriptions (e.g., service contracts) to customers that access their networks in order to obtain voice, data or other services. A subscription might be for any length of time, such as a number of months or years. In one common arrangement, the customer pays a recurring monthly charge for a predetermined amount of access to the wireless wide area network. For example, the customer might pay a flat monthly charge and in return get a predetermined number of minutes of voice calls and/or a predetermined number of megabytes of data services each month. The customer might then pay additional charges for any usage over these predetermined amounts.

Alternative billing arrangements are also possible. For example, rather than paying a recurring monthly charge for a predetermined amount of access to the wireless wide area network, the customer might only pay for the customer's actual usage. That is, the customer might pay a per minute and/or per megabyte charge for the actual number the number of minutes of voice calls and/or number of megabytes of data services that the customer uses that month. Other billing arrangements are also possible. Additionally, the service provider might include special incentives in the customer's contract, such as free nights and weekends, free long distance or other such incentives.

Although the service provider might provide a variety of different services to a customer, the respective costs incurred by the service provider for providing these services might not be the same. For example, the costs incurred by a service provider for a call between two wireless devices on the wireless wide area network might be different than the costs the service provider incurs for a call between one wireless device on the wireless wide area network and a device on another network. Additionally, even different calls between wireless devices that are both on the wireless wide area network might have different associated costs depending on how the different calls are established and transported over the wireless wide area network. While the service provider may have a higher or lower cost associated with a particular call, those variations would not then be reflected in the amount actually charged to the customer.

Therefore, there exists a need to provide improved billing functions in a wireless wide area network.

SUMMARY OF THE INVENTION

A wireless wide area network may monitor calls made by wireless devices on the wireless wide area network. For a call involving a wireless device on the wireless wide area network, a network entity on the wireless wide area network may make a record of the call, and the record may include an indication of whether the call was established with vocoder bypass. In one embodiment, the network entity is a mobile switching center and the record is a call detail record. In another embodiment, the network entity is a packet data serving node and the record is a usage data record.

The records may be stored in one or more billing databases, which may be located on the wireless wide area network or on another network. A service provider for the wireless wide area network may then use indications in the records, at least in part, for billing a user of the wireless device for accessing the wireless wide area network. In one embodiment, the records may also be used to offer special incentives or discounts to users engaged in a certain level of vocoder bypass calls. In another embodiment, the records may be used to compile various statistics related to vocoder bypass calls established on the wireless wide area network.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Overview

Figure 1:
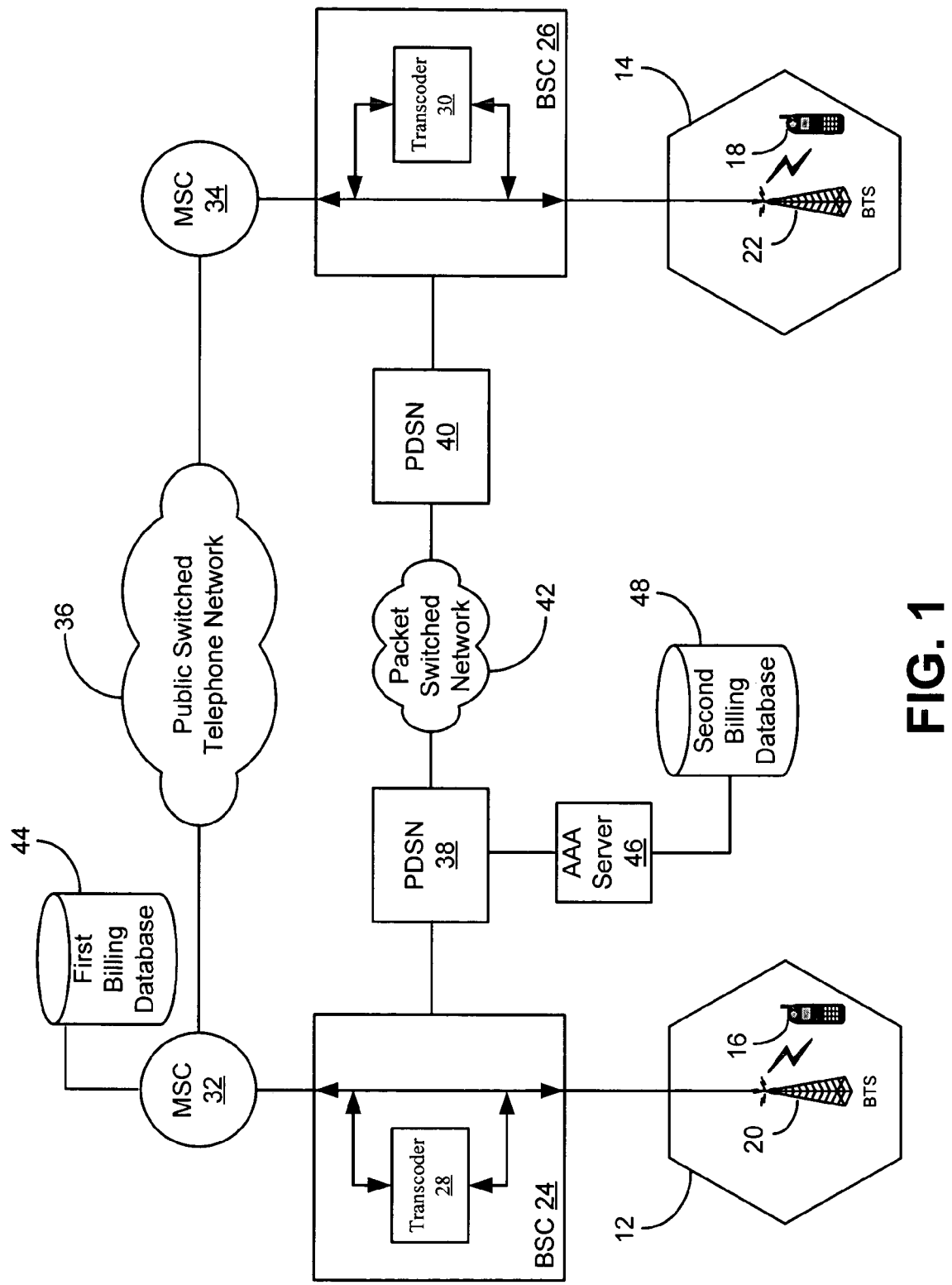
FIG. 1 is a block diagram of an exemplary wireless wide area network that supports enhanced billing for vocoder bypass calls.

Wireless devices often transmit and receive voice and other media in a compressed digital format in order to reduce bandwidth. In particular, a wireless device may receive voice or other media from a user, digitize it, compress the digital signals in accordance with various algorithms, and then transmit the voice or other media in the compressed digital format. A wireless device that receives media in the compressed digital format decodes it in order to uncover the original signal. Wireless devices typically include vocoders to convert the voice or other media between analog and compressed digital formats.

The particular costs a service provider incurs for a call may depend on the particular compressed digital formats used for that call, and they may also depend on whether the compressed digital formats are used on all legs of a call or only on some legs of a call. A service provider for a wireless wide area network might track these attributes of calls involving devices on the wireless wide area network. The service provider may subsequently use this information as a basis to determine the costs charged to the user of the wireless device for accessing the wireless wide area network. The service provider might also use this information to offer special discounts, incentives or other programs to the user of the wireless device.

A number of different compressed digital formats are commonly used in wireless wide area networks. One example is the Enhanced Variable Rate Codec ("EVRC"), which supports voice transmission at a data rate of about 8 Kbps. EVRC is described in the TIA/EIA/IS-127-3 standard, "Enhanced Variable Rated Codec, Speech Service Option 3 for Wideband Spread Spectrum Digital Systems." Another example is the Selectable Mode Vocoder ("SMV"), which supports voice transmission at a data rate of about 4 Kbps. SMV is described in the TIA/EIA/IS-893 standard, "Selectable Mode Vocoder Service Option for Wideband Spread Spectrum Communication Systems." SMV is a higher compression format than EVRC as it only requires about half the bandwidth of EVRC. Wireless devices that support the SMV format are typically backward compatible and also support the less efficient EVRC format.

In contrast, circuit-switched telephone networks, such as the public switched telephone network ("PSTN"), typically carry voice or media in an uncompressed digital format, such as a pulse code modulation ("PCM") format. For example, in a typical PCM format, a voice signal is sampled at a rate of 8000 times a second and digitized with an 8-bit resolution, resulting in a 64 Kbps signal. Trunks used in the PSTN are often able to carry many of these 64 Kbps signals at a time in separate channels. For example, a T-1 trunk can carry 24 of these 64 Kbps channels.

Wireless telecommunications systems often use transcoders to convert between the compressed digital formats used by wireless devices and the PCM or other format used by circuit-switched telephone networks. However, using transcoders can result in inefficiencies. For example, in a call that involves two wireless devices, the voice or other media exchanged in the call may be transcoded twice. One transcoder may convert the media from the transmitting wireless device to PCM format for transmission through the PSTN, and another transcoder may convert the media from the PCM format to the compressed media format for transmission to the receiving wireless device. Using transcoders "in tandem" like this is often undesirable, because each transcoder can add delay to the call and can degrade the quality of the voice or other media.

To address these concerns, various proposals have been made to provide "tandem free operation" ("TFO") in calls between wireless devices in which the transcoders are bypassed and the PSTN carries media in the compressed digital format without transcoding. One such method is described in $3^{rd}$ Generation Partnership Project 2, "CDMA Tandem Free Operation," 3GPP2 A. S0004-B v2.0 (Aug. 5, 2002). In this method, an inband signaling protocol is used to test if the call is a mobile-to-mobile call, if the wireless devices use the same compressed digital format, and if the systems at both end of the call support tandem free operation. If these tests are successful, the inband signaling protocol establishes a "transparent" digital channel through the PSTN, and the transcoders are bypassed. The media is then carried through the PSTN in the original compressed digital format, which uses 16 Kbps "TFO frames" that are mapped onto the two least significant bits in a 64 Kbps PCM frame.

While a call might be carried over a circuit-switched network, the call might alternatively be carried over a packet-switched network. For example, two wireless devices might be served by respective access points with the access points in turn communicatively coupled via a packet-switched network rather than the PSTN. In calls between the wireless devices where the wireless devices both support the same compressed digital format, the transcoders might similarly be bypassed so that the voice or media is then carried through the packet-switched network in the original compressed digital format to provide "transcoder free operation" ("TrFO") for the call. Vocoder bypass generally refers to bypassing transcoders in calls between wireless devices, while "tandem-free operation" and "transcoder-free operation" refer to the more specific cases when the calls are completed over circuit-switched and packet-switched networks respectively.

The service provider's costs associated with a particular call may vary depending on whether the call is established with vocoder bypass. For example, calls that are established with vocoder bypass generally require less network resources than calls that are established without vocoder bypass and thereby would generally have a lower associated cost. For instance, the base station controller for a wireless device engaged in a call established with vocoder bypass would not need to decompress wireless signals received from the wireless device for transmission in turn via an intermediate transport network, nor would the base station controller need to compress signals received via the intermediate transport network for transmission in turn to the wireless device. Since the base station controller would not need to perform this additional processing, the call would accordingly require less network resources and result in a lower overall cost for the service provider.

Additionally, calls that are established with vocoder bypass generally require less bandwidth than calls that are established without vocoder bypass. Moreover, for calls that are established with vocoder bypass, the particular compressed digital format will also affect the amount of bandwidth required by the call. For example, a vocoder bypass call that uses SMV will generally require less bandwidth than a vocoder bypass call that uses EVRC. The amount of bandwidth used by a call is generally directly correlated to the costs associated with that call, such that a call using less bandwidth has a lower associated cost than a call using more bandwidth.

The wireless wide area network may track how calls are established, such as whether they are established with or without vocoder bypass. In addition, the wireless wide area network may even track the particular compressed digital format used in calls established with vocoder bypass. This information may subsequently be used as a basis for billing a subscriber for services. For example, the wireless wide area network may monitor the calls of a particular subscriber to determine whether they are established with vocoder bypass, and if so, which compressed digital format is used for the calls. The service provider may then bill these calls to the subscriber differently, such as at a lower rate, than it bills calls that are not established with vocoder bypass.

2. Exemplary Architecture

FIG. 1 is a block diagram of an exemplary wireless wide area network that supports enhanced billing for calls with vocoder bypass. As depicted in figure, the wireless wide area network includes a first coverage area 12 and a second coverage area 14. A first wireless device 16 is located within the first coverage area 12, and a second wireless device 18 is located within the second coverage area 14. While FIG. 1 depicts a single wireless device within each coverage area 12, 14, the two coverage areas 12, 14 may each include a greater or fewer number of wireless devices.

The wireless devices 16, 18 may access the wireless wide area network for voice and/or data services. The wireless devices 16, 18 may be wireless telephones, wireless personal digital assistants ("PDAs"), two way radios, wirelessly equipped laptop computers, or other devices that are able to transmit and receive voice or other media over an air interface. In the wireless wide area network, each wireless coverage area may include one or more access points with which wireless devices can communicate in order to access the wireless wide area network.

In one embodiment, the wireless wide area network is a wireless telecommunications network and the access points are base transceiver stations ("BTSs"). The wireless coverage areas can then be sectors of the wireless telecommunications network. In this embodiment that is depicted in FIG. 1, a first BTS 20 serves wireless devices within the first coverage area 12, and a second BTS 22 serves wireless devices within the second coverage area. Although FIG. 1 depicts only two BTSs, the network may optionally include a greater number of BTSs. Also, the wireless devices 16, 18 may be able to roam into other coverage areas and to communicate with other BTSs. The wireless devices 16, 18 may also be able to roam to other wireless wide area networks.

The wireless devices 16, 18 and the BTSs 20, 22 may respectively communicate with each other using the same air interface protocol or using different air interface protocols. The BTSs 20 and 22 preferably communicate with the wireless devices 16, 18 using code division multiple access ("CDMA"). CDMA is described in further detail in the Telecommunications Industry Association ("TIA") standards IS-95A and IS-95B. CDMA is also described in the International Telecommunications Union ("ITU") IMT-2000 series of standards. CDMA is further described in the TIA IS-2000 series of standards. The IS-2000 series of standards are commonly referred to as CDMA2000.

Other protocols might also be used. For example, Wideband CDMA ("WCDMA"), Time Division Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), General Packet Radio Services ("GPRS"), IS-136, Time Division Multiple Access ("TDMA"), Frequency Division Multiple Access ("FDMA") or other might alternatively be used. Additional wireless protocols, such any of those protocols under the Institute of Electrical and Electronics Engineers ("IEEE") 802.11 umbrella, Bluetooth® or others might also be used.

Base station controllers ("BSCs") 24, 26 connect to the BTSs 20, 22, respectively. While FIG. 1 shows the BSCs 24, 26 connected to only one BTS each, the BSCs 24, 26 may each be connected to a plurality of BTSs. The BSCs 24, 26 may be used to control the BTSs to which they are connected. The BSCs 24, 26 may also each include respective transcoders 28, 30 for converting between media formats, as is described in more detail below. Although FIG. 1 shows the transcoders 28 and 30 as being located in BSCs 24, 26 respectively, transcoders 28 and 30 could be located in other network elements.

Mobile switching centers ("MSCs") 32, 34 connect to the BSCs 24, 26, respectively. Although FIG. 1 shows the MSCs 32, 34 connected to only one BSC each, the MSCs 32, 34 may each be connected to a plurality of BSCs. The MSCs 32, 34 function to connect calls to and from wireless devices via BSCs and BTSs. In this regard, the MSCs 32, 34 are connected to a circuit-switched telephone network, e.g., the public switched telephone network ("PSTN") 36 and may use a signaling system, such as SS7, to setup calls through the PSTN 36.

By using appropriate SS7, IS-41, and/or other signaling, the MSC 32 may connect incoming calls from the PSTN 36 to wireless devices operating in areas served by associated BTSs. Such calls may originate from landline telephones, wireless devices or other devices, which may be located on the wireless wide area network or on another network. Similarly, the MSC 32 may connect calls originating from wireless devices operating in areas served by associated BTSs to their destinations, via the PSTN 36. Such destinations may include landline telephones, wireless devices or other devices, and these devices may also be on the wireless wide area network or on another network. The other MSC 34 may also connect calls in a similar manner.

In many cases, wireless devices may transmit and receive media, such as voice, in a format different than the format in which media is carried in the PSTN 36. In particular, the PSTN 36 may carry media in a Pulse Code Modulated format, whereas the wireless devices 16, 18 may transmit and receive media in a compressed digital format. The compressed digital format could be, for example, the Enhanced Variable Rate Codec format or the Selectable Mode Vocoder format. However, other compressed digital formats could be used.

As noted above, each BSC 24, 26 may include a respective transcoder 28, 30 that is used for converting between the different media formats used by wireless devices and by the PSTN 36. The first transcoder 28 may convert between the compressed digital format used by wireless devices served by the BTS 20 and the PCM format used by PSTN 36. Similarly, the second transcoder 30 may convert between the compressed digital format used by wireless devices served by the BTS 22 and the PCM format used by the PSTN 36.

The transcoders 28, 30 may each support one or more compressed digital formats. In one embodiment, the transcoders 28, 30 both support EVRC and SMV. Thus, the transcoders 28, 30 can service wireless devices that use one or both of these compressed digital formats. Similarly, wireless device might support one or both of these compressed digital formats. For example, the first wireless device 16 might support both SMV and EVRC, while the second wireless device 18 might support EVRC but not SMV. It should be understood, however, that the wireless devices 16, 18 may use other compressed digital formats. Additionally, the transcoders 28, 30 might not necessarily support the same compressed digital formats as each other.

The transcoders 28, 30 may also be selectively bypassed. In particular, the BSCs 24, 26 may be able to convey media between their respective BTSs 20, 22 and MSCs 32, 34 either with or without transcoding. If both endpoints of a call use the same digital compression format, the MSCs 32, 34 may both bypass their respective transcoders 28, 30. For example, if the wireless devices 16, 18 both support EVRC and are the endpoints of the call, then the MSCs 32, 34 may control the BSCs 24, 26 to bypass their respective transcoders 28, 30. For example, the MSCs 32, 34 may engage in in-band signaling to establish a "transparent" TFO connection through the PSTN 36. Once the TFO connection is established, the MSCs 32, 34 may exchange EVRC, coded into specialized TFO frames, via the PSTN 36.

In accordance with exemplary embodiments of the present invention, the BSCs 24, 26 may also connect to respective PDSNs 38, 40. The PDSNs 38, 40 may be capable of conveying media in EVRC, SMV or other compressed digital formats. A packet-switched network 42 may interconnect the PDSNs 38, 40. In an exemplary embodiment, the packet-switched network 42 may include one or more local area networks (LANs) and/or one or more wide area networks (WANs), such as the Internet. The BSCs 24, 26 may use their respective PDSNs 38, 40 to convey media via the packet-switched network 42 without going through the PSTN 36. The PDSNs 38, 40 may also convey the media via the packet switched-network 42 with or without transcoding.

The packet-switched network 42 may route packets based on network addresses, such as by using the Internet Protocol ("IP") protocol in combination with the User Datagram Protocol ("UDP") or Transmission Control Protocol ("TCP"). The IP packets may be carried over lower level protocols, such as asynchronous transfer mode ("ATM") protocols. In addition, higher-level applications and protocols, such as the Session Initiation Protocol ("SIP"), may be carried as UDP/IP or TCP/IP packets. Relevant aspects of SIP are described in Rosenberg, et al., "SIP: Session Initiation Protocol," Internet Engineering Task Force ("IETF") Request for Comments 3261 (June 2002).

Media may be carried over the packet-switched network 42 in a real-time packet media format, e.g., by using the real-time transport protocol ("RTP"). More particularly, the packet-switched network 42 may carry the media transmitted by wireless devices in the original compressed digital format, using RTP. Relevant aspects of RTP are described in Schulzrinne, et al., "RTP: A Transport Protocol for Real-Time Applications," IETF Request for Comments 1889 (January 1996).

In addition to carrying media, the packet-switched network 42 may also carry voice traffic. That is, a voice call could be completed over either the packet-switched network 42 or the PSTN 36. Various protocols, such as Voice over IP ("VoIP"), may be used to carry voice traffic over the packet-switched network 42. These protocols may be used in conjunction with other higher or lower level protocols.

In accessing the wireless wide area network for voice or data services over the packet-switched network 42, the wireless device 16 might first establish a point-to-point ("PPP") connection with the PDSN 38. PPP is a data link protocol for communication between two devices. The wireless device 16 might then use higher level protocols, such as IP or others, to communicate with another device via the packet-switched network 42. PPP is described in more detail in IETF Request for Comments 1661, 1662 and 1663.

The wireless wide area network may include various elements that are used to track a customer's usage of the wide area network, such as when the customer participates in a call or a data connection with the wireless wide area network. The service provider may later use information about the customer's usage in order to bill the customer for accessing the wireless wide area network. This information might additionally be used to provide special discounts, promotions or incentives to the customer. Additionally, the information might also be used to monitor usage patterns of the wireless wide area network regardless of whether it is also used as a basis to bill customers.

When the first wireless device 16 initiates a call that is established over the PSTN 36, the first MSC 32 can generate a call detail record ("CDR") for the call. The call detail record generally includes information about the call. For example, it can identify the originating switch, the terminating switch, the length of the call and the time of day the call was made. The call detail record might also identify the start time of the call, the stop time of the call, the number called, the date of the call or other information. The particular information stored in the call detail record may vary between wireless wide area networks, and it may also be configured by the service provider for the wireless wide area network.

In addition to the previously described information, the call detail record may also include information about how the call was established. For example, the call detail record may specify whether the call was established with vocoder bypass or whether the call was established without vocoder bypass. If the call was established with vocoder bypass, then the call detail record might also specify the particular digital compression method (e.g., SMV or EVRC) that was used by the wireless devices. For example, once the call is established, the BSC 24 can inform the MSC 32 whether the call was established with vocoder bypass and, if so, the digital compression method used for the call. The MSC 32 can receive the information and then later include it in the call detail record for that call.

After the call ends, the MSC 32 can send the call detail record to a first billing database 44 for the wireless wide area network. The first billing database 44 may be located on the wireless wide area network, and it can store call detail records received from one or more entities, such as the MSC 32. That is, the first billing database 44 might only receive and store call detail records from the MSC 32, or it might alternatively receive and store call detail records from a variety of MSCs, switches or other network elements.

While this figure depicts the first billing database 44 as connecting directly with the MSC 32, it might alternatively be located at another location either on or off the wireless wide area network. The MSC 32 may then communicate with the first billing database 44 through one or more intermediate network elements and/or networks. Additionally, while FIG. 1 depicts the first billing database 44 as a standalone device, it might alternatively be part of a server or other network element rather than a standalone device. The other device may provide additional functionality as well. Also, the first billing database 44 might alternatively be split into a plurality of different databases, which may be located at the same or different locations on the wireless wide area network.

In one embodiment, the first billing database 44 is a relational database that supports Structured Query Language ("SQL"); however, other types of databases may alternatively be used. Various other alternatives to a database may be used to store the call detail records. For example, it is not necessary that the first billing database 44 is even a database. In various embodiments, the call detail records might be stored in a flat file format or in some format other than in a database. These alternative formats might be standardized formats, or they might be proprietary formats used by the wireless wide area network.

When the call or a data connection is established over the packet-switched network 42 instead of over the PSTN 36, the wireless wide area network might not generate a call detail record for the call. For these types of calls, the MSC 32 is generally not be involved in establishing or routing the call. Rather, the wireless device 16 communicates with the PDSN 38, such as to establish a PPP session with the PDSN 38. The PDSN 38 then manages establishing and routing the call over the packet-switched network 42. Since the MSC 32 is generally not involved in processing the call, the wireless wide area network might use a mechanism other than call detail records to track information about the call.

The PDSN 38 can monitor and record information about the call in a way that is similar to how the MSC 32 monitors and records information for a call that is established over the PSTN 36. For example, the PDSN 38 can monitor the number of packets, the number of bytes or some other measure of the amount of data that is processed during the call. This measure can be analogous to the number of minutes that are used in a circuit-switched call. Once the call is completed, the PDSN 38 can include this information in a usage data record ("UDR") that is provided to an authentication, authorization and accounting ("AAA") server 46. The usage data record may also include an indication of whether the call was established with vocoder bypass and, if so, the particular vocoder used by the wireless devices.

The AAA server 46 interfaces with the PDSN 38 and provides functionality for authenticating wireless devices, authorizing wireless devices to access with wireless wide area network and tracking wireless devices' usage of network resources. In addition to receiving the usage data record from the PDSN 38, the AAA server 46 can also track other information about the call, such as the start time and the stop time of the call. Once the call is completed and the AAA server 46 receives the usage data record from the PDSN 38, the AAA server 46 it can compile information in the usage data record along with other information the AAA server 46 tracks about the call in to an IP detail record ("IPDR").

The AAA server 46 may then provide the IP detail record to a second billing database 48. The second billing database 48 can store IP detail records received from the AAA server 46, and it may also store IP detail records received from other AAA servers, such as those serving other PDSNs. As with the first billing database 44, the second billing database 48 might not be a database at all and might use alternative mechanisms to store IP detail records. Additionally, the second billing database 48 may be located at other locations on or off the wireless wide area network, it may interface with the AAA server 46 through one or more intermediate network elements and/or networks, or it may be split into multiple different databases.

Call detail records are described in more detail in "Specification of TMN applications at the Q3 interface: Call detail recording," ITU-T Recommendation Q.825 (June 1998); and N. Brownlee et al., "Accounting Attributes and Record Formats," IETF Request for Comments 2924 (September 2000). AAA servers are described in more detail in Hiller et al., "CDMA2000 Wireless Data Requirements for AAA," IETF Request for Comments 3141 (June 2001).

3. Exemplary Operation

Figure 2:
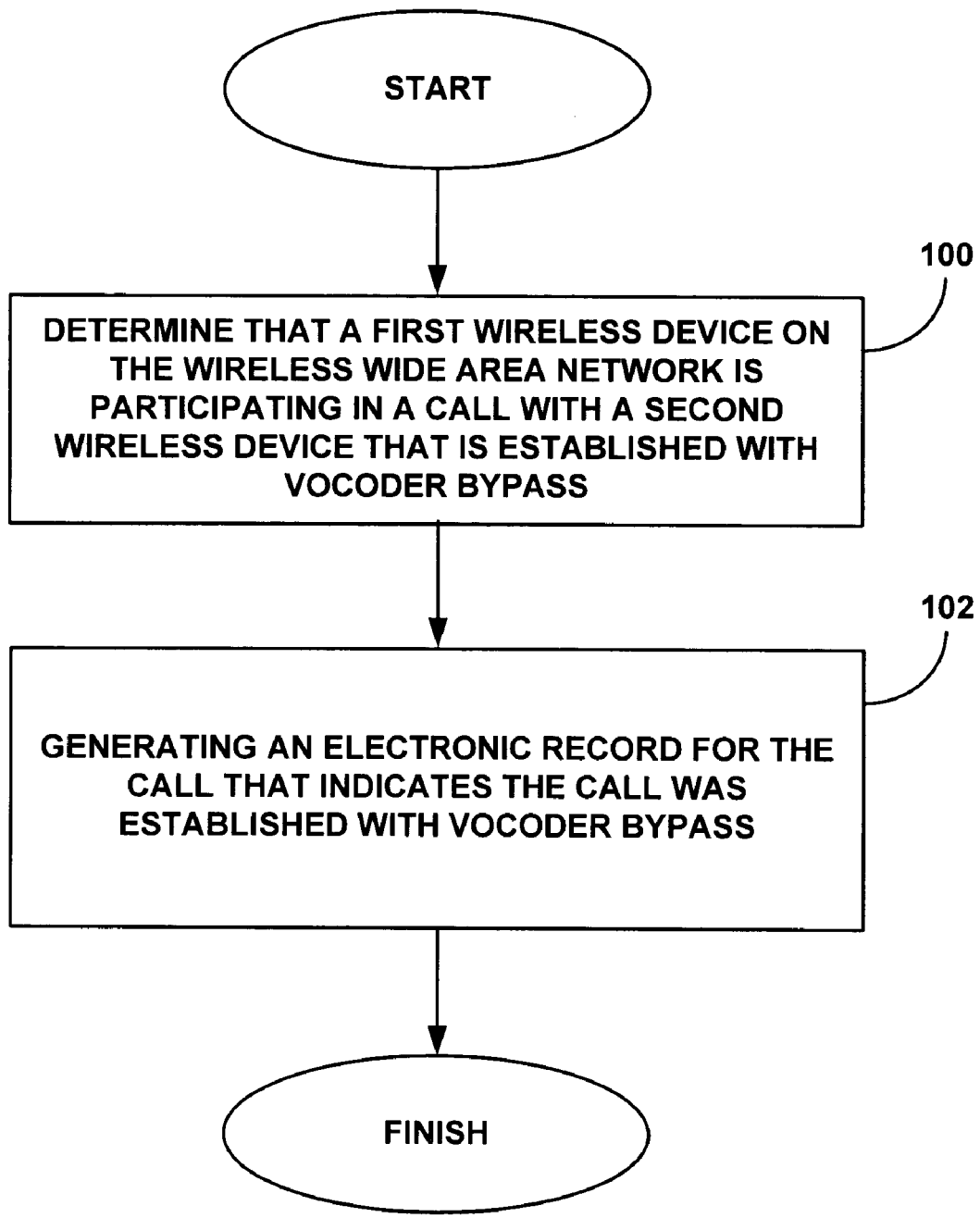
FIG. 2 is a flowchart of an exemplary process for tracking vocoder bypass calls in a wireless wide area network.

FIG. 2 is a flowchart of an exemplary process for tracking vocoder bypass calls in a wireless wide area network. At Step 100, a network element determines that the first wireless device is participating in a call with a second wireless device and that the call is established with vocoder bypass. The network element might vary depending on the particular type of wireless wide area network and even based on the type of call. For example, in the wireless wide area network of FIG. 1, the network element might be a mobile switching center when the call is completed over a circuit-switched network, and the network element might be a packet data serving node when the call is completed over a packet-switched network.

At Step 102, the network element generates an electronic record for the call that indicates the call was established with vocoder bypass. The network element might generate the record at various different times, such as before the call is established with the second wireless device, during the call, or after the call has been completed. The particular type of electronic record might vary depending on the particular wireless wide area network and even the type of the call. For example, in the wireless wide area network of FIG. 1, the electronic record may be a call detail record when the call is completed over a circuit-switched network, and the electronic record may be a usage data record when the call is completed over a packet-switched network. These are merely examples, and other types of electronic records may be used.

After generating the electronic record, the network entity may then provide the electronic record to a billing database. For example, where the electronic record is a call detail record created by a mobile switching center, the mobile switching center may provide the electronic record directly to the billing database. Alternatively, where the electronic record is a usage data record generated by a packet data serving node, the packet data serving node may provide the electronic record to an AAA server, which in turn creates another electronic record that is sent to the billing server. Other variations are possible depending on the particular wireless wide area network and its specific implementation.

In one embodiment, the service provider may additionally analyze electronic records stored in one or more billing databases in order to compile various statistics about a particular device's usage of the wireless wide area network as well as statistics about the entire wireless wide area network. For example, the service provider might identify the percentage of calls that used vocoder bypass, the particular types of users that are more likely to engage in vocoder bypass call, various sectors of the network that have a higher percentage of vocoder bypass calls, or a variety of other statistics. These statistics might be used in evaluating network usage, reconfiguring the network, or a for a variety of other purposes.

Figure 3:
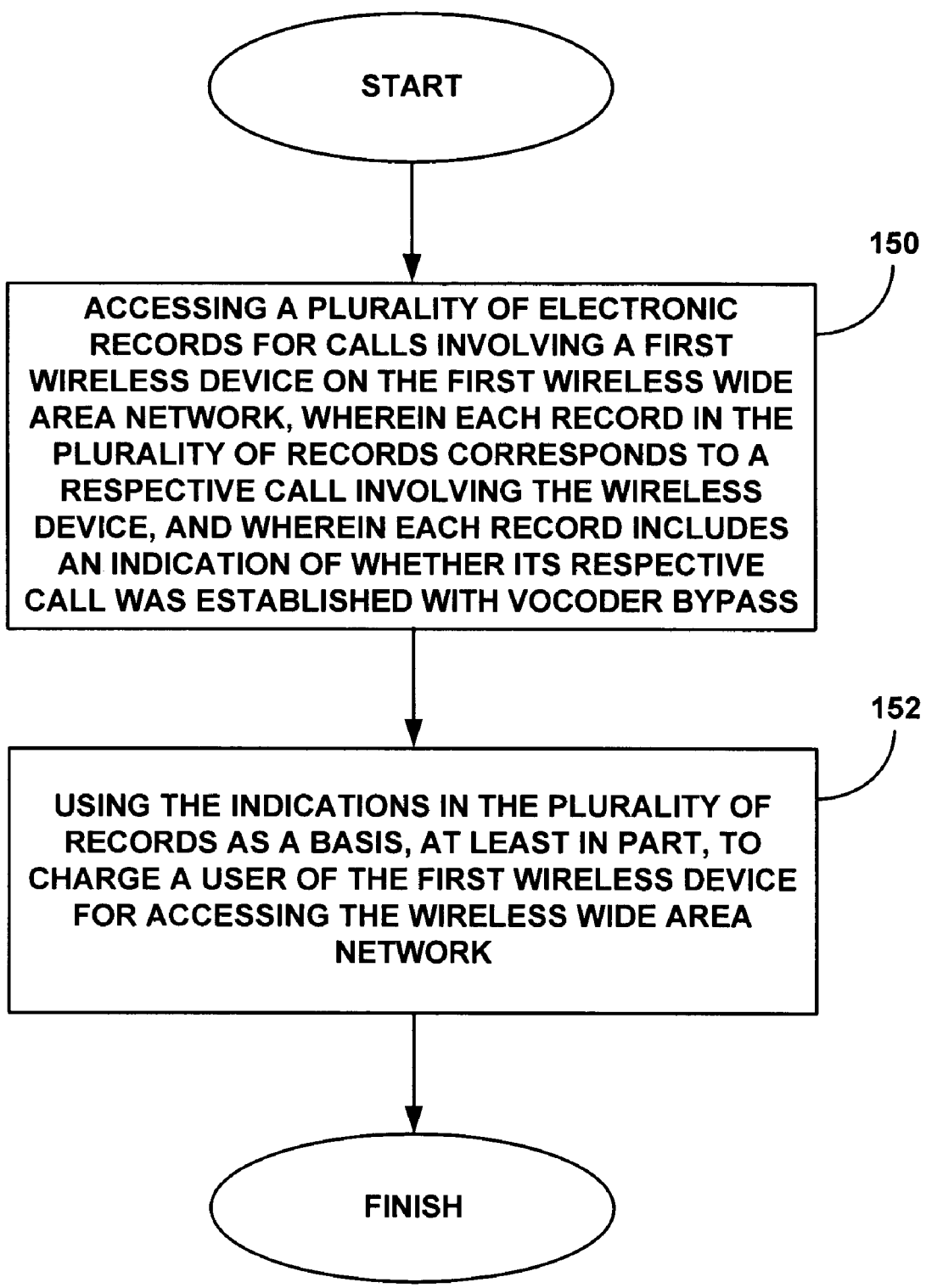
FIG. 3 is a flowchart of an exemplary process for enhanced billing of vocoder bypass calls in a wireless wide area network.

FIG. 3 is a flowchart of an exemplary process for enhanced billing of vocoder bypass calls in a wireless wide area network. At Step 150, an entity accesses a plurality of electronic records for calls involving a first wireless device on the wireless wide area network, wherein each record in the plurality of records corresponds to a respective call involving the wireless device, and wherein each record includes an indication of whether its respective call was established with vocoder bypass. The plurality of records may be stored, for example, in one or more different databases or other storage mechanisms. For example, the plurality of records may be stored in one or more billing databases.

The entity accessing the electronic records might be, for example, a computer or other device on the wireless wide area network. The entity may be involved in processing call data, such as the plurality of records, in order to generate charges assessed to a user of the first wireless device for accessing the wireless wide area network. At Step 152, the entity uses the indications in the plurality of records as a basis, at least in part, to charge a user of the wireless device for accessing the wireless wide area network. For example, the entity might use the plurality of records in order to generate a monthly bill for the user of the wireless device.

The records might be used in a variety of different ways as a basis for charging a user of the wireless device for accessing the wireless wide area network. For example, the service provider of the wireless wide area network may charge the user at one rate for calls that are established with vocoder bypass and at a different rate for calls that are established without vocoder bypass. In this example, the entity might then search through one or more of the plurality of records, and if the call detailed in a particular record was established with vocoder bypass, then the user may be charged at a first rate for that call. Otherwise, the user may be charged at a second rate for that call. In one embodiment, the first rate is lower than the second rate such that calls established with vocoder bypass are billed at a lower rate than calls that are established without vocoder bypass.

A variety of different billing plans may be used by the service provider, and the charges assessed to a particular user may depend on the billing plan associated with that user. For example, the user may be charged for each call the user makes on the wireless wide area network. In this case, the entity may search through all the records of calls involving that user's wireless device that were made within a specified billing period (e.g., a month or some other period). The calls may then be billed to the user based on whether they were completed with or without vocoder bypass, such as was previously described, with calls that were established with vocoder bypass billed at one rate and calls that were established without vocoder bypass billed at a different rate.

Alternatively, the user may pay a flat fee each month for a predetermined amount of access to the wireless wide area network, such as a predetermined number of minutes and/or a predetermined number of bytes. In this case, the entity may then just search for records of calls that were made after the user exceeded these predetermined thresholds. The user may then be billed for the excess calls based on whether they were established with vocoder bypass, such as at a first rate for those calls that were established with vocoder bypass and at a second rate for those calls that were established without vocoder bypass.

In another embodiment, the service provider may use the plurality of records as a basis for offering discounts or other incentives to users of the wireless wide area network. The discounts might reward the user for making the lower cost vocoder bypass calls. Additionally, the discounts and incentives might encourage the user to make more of these types of call in the future. The discounts and incentives might be based on a variety of different factors, such as the absolute amount of vocoder bypass calls made by the user or the relative number of vocoder bypass calls compared to all calls made by the user. Other factors might also be used as the basis for offering discounts or incentives.

For example, when the service provider uses a percentage as a basis for offering a discount or incentive, the service provider may determine a percentage of records in the plurality of records where the corresponding calls were established with vocoder bypass. That is, the plurality of records may include some calls that were made with vocoder bypass and some calls that were made without vocoder bypass, but it is also possible that all calls where made with or without vocoder bypass. Alternatively, the service provider may determine the percentage of minutes that user was engaged in calls that were established with vocoder bypass, or the percentage of bytes, packets or some other measure that were sent in calls that were established with vocoder bypass. These are merely examples, and other percentages may also be used.

If the percentage or other measure exceeds a threshold, the service provider may then provide the user with a discount on the charges billed to the user for accessing the wireless wide area network. For example, the service provider may provide a discount on all calls made by the user, regardless of whether the calls were established with vocoder bypass. In another example, the service provider may provide a discount on calls made by the user that were established with vocoder bypass but not provide a discount on calls made by the user that were not established with vocoder bypass. Other discounts might also be provided based on this information.

In another embodiment, the plurality of records may be used to provide incentives to the user for making future calls. For example, the service provider may search the plurality of records to compile a list of wireless devices with which the user's wireless device has engaged in calls that were established with vocoder bypass. The service provider may then offer the user an incentive for making future calls to wireless devices in the list of wireless devices. For example, the service provider may list one or more of these wireless devices in the user bill and offer the user a discount on calls made to one or more of these wireless devices. The discount may apply to all calls made to these wireless devices or apply to calls over a predetermined threshold made to these wireless devices.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams. The claims should not be read as limited to the described order or elements unless stated to that effect.

In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for billing vocoder bypass calls in a wireless wide area network, the method comprising:
    accessing a plurality of electronic records for calls involving a first wireless device on the wireless wide area network, wherein each electronic record in the plurality of electronic records corresponds to a respective call involving the wireless device, wherein each said respective call is a call that could have been established with vocoder bypass, and wherein each electronic record includes an indication of whether its respective call was established with vocoder bypass; and
    using the indications in the plurality of electronic records as a basis, at least in part, to charge a user of the first wireless device for accessing the wireless wide area network.

2. The method of claim 1, wherein using the indications in the plurality of electronic records comprises:
    for at least one electronic record in the plurality of electronic records, determining whether its respective call was established with vocoder bypass; and
    if the corresponding call was established with vocoder bypass, charging the user for the corresponding call at a first rate, otherwise charging the user at a second rate.

3. The method of claim 1, wherein the first rate is lower than the second rate.

4. The method of claim 1, wherein using the indications in the plurality of electronic records comprises:
    determining a percentage of electronic records in the plurality of electronic records where the corresponding calls were established with vocoder bypass; and
    if the percentage exceeds a predetermined threshold, then providing the user with a discount on the charges billed to the user for accessing the wireless wide area network.

5. The method of claim 1, wherein using the indications in the plurality of electronic records comprises:
  searching the plurality of electronic records to compile a list of wireless devices with which the first wireless device has engaged in calls that were established with vocoder bypass; and
  offering the user an incentive for making future calls to wireless devices in the list of wireless devices.

6. The method of claim 1, wherein using the indications in the plurality of electronic records comprises:
  searching the plurality of electronic records to determine an amount of calls over a predetermined monthly threshold; and
  for calls over the predetermined monthly threshold that were established with vocoder bypass, charging the user for the calls at a first rate, otherwise charging the user for the calls at a second rate.

7. The method of claim 6, wherein the amount of calls is measured based on a duration of the calls, a number of bytes transmitted during the calls or a number of packets transmitted during the calls.

8. The method of claim 6, wherein the first rate is lower than the second rate.

* * * * *